US008484435B2

(12) United States Patent
Gremaud et al.

(10) Patent No.: US 8,484,435 B2
(45) Date of Patent: Jul. 9, 2013

(54) METHOD FOR UPDATING DATA IN MEMORIES USING A MEMORY MANAGEMENT UNIT

(75) Inventors: Fabien Gremaud, Chatel-St-Denis (CH); Henri Kudelski, Chexbres (CH)

(73) Assignee: Nagravision S.A., Cheseaux (CH)

( * ) Notice: Subject to any disclaimer, the term of this patent is extended or adjusted under 35 U.S.C. 154(b) by 365 days.

(21) Appl. No.: 13/055,413

(22) PCT Filed: Jul. 23, 2009

(86) PCT No.: PCT/EP2009/059467
§ 371 (c)(1),
(2), (4) Date: Jan. 21, 2011

(87) PCT Pub. No.: WO2010/010137
PCT Pub. Date: Jan. 28, 2010

(65) Prior Publication Data
US 2011/0131389 A1 Jun. 2, 2011

(30) Foreign Application Priority Data

Jul. 24, 2008 (EP) .................................... 08161092

(51) Int. Cl.
*G06F 12/10* (2006.01)
(52) U.S. Cl.
USPC ............................ 711/206; 711/207; 717/168
(58) Field of Classification Search
USPC ..... 711/202, 203, 206, 207; 726/26; 717/168, 717/169, 170, 174, 175
See application file for complete search history.

(56) References Cited

U.S. PATENT DOCUMENTS

| 7,779,394 B2* | 8/2010 | Homing et al. ................ 717/136 |
| 2006/0129794 A1 | 6/2006 | Rudelic |
| 2007/0050594 A1* | 3/2007 | Augsburg et al. .............. 711/207 |
| 2007/0234070 A1* | 10/2007 | Horning et al. ................ 713/190 |
| 2008/0215848 A1* | 9/2008 | Sheu et al. ..................... 711/207 |
| 2010/0100965 A1* | 4/2010 | O'Brien et al. .................. 726/25 |

OTHER PUBLICATIONS

International Search Report issued in International Application No. PCT/EP2009/059467, mailed Oct. 6, 2009.
Written Opinion issued in International Application No. PCT/EP2009/059467, mailed Oct. 6, 2009.
"Address-Translation Patching Mechanism", IBM Technical Disclosure Bulletin, vol. 36, No. 8, pp. 15-18 (Aug. 1993).

* cited by examiner

*Primary Examiner* — John Lane
(74) *Attorney, Agent, or Firm* — DLA Piper LLP US

(57) ABSTRACT

A method for updating, in the background, data stored in physical memories without affecting the current operations performed by the microprocessor. When the update is completely terminated, the application switches from an old version to a new version. This switching occurs by a reconfiguration of the page table during which a first sub-tree structure of pointers accessing the old version of data stored in memories is replaced by a second sub-tree structure of pointers thus allowing access to the new version of data. This update method prevents incoherent transitory states of the system as the latter works with the previous data version until the installation of the new version becomes usable. In the case of an interruption to the update process, the application can always reinitialize the update since the old version of data can be reactivated by returning to the previous configuration of the page table.

13 Claims, 2 Drawing Sheets

METHOD FOR UPDATING DATA IN MEMORIES USING A MEMORY MANAGEMENT UNIT

FIELD OF THE INVENTION

The present invention relates to devices comprising one or several microprocessors performing various tasks thanks to at least one software program including machine code and data stored in memories. More particularly, the method of the invention is aimed at carrying out partial or complete updates of the software program by involving a memory management unit associated with the microprocessor.

TECHNICAL BACKGROUND

A microprocessor controls the memory with a memory management system that is commonly implemented in a hardware and software form. The hardware part of the system forms a memory management unit (MMU) that can be included in the microprocessor or be in the form of a separate component, either integrated on the same chip as the microprocessor, or forming a distinct integrated circuit connected to the microprocessor and the memory.

The memory management unit (MMU) performs memory transactions including functions for translating virtual addresses into physical addresses, functions for protecting the memory and controlling cache memories.

The presently used microprocessors mostly support the notion of virtual memory. In a virtual memory system, program instructions executed by the microprocessor refer to data using virtual addresses in a virtual memory space of the microprocessor. This space can be much larger than the physical memory space available in the system.

The virtual addresses of the microprocessor are translated by a memory management unit (MMU) into physical addresses used for the access to the system memory or to other storage devices. The virtual memory uses a pagination mechanism to translate or match the virtual addresses with physical addresses. The physical memory space is divided into physical pages having a fixed size, for example 4 kilobytes. The virtual addresses comprise one part of page address and one part of page shift or page offset. The virtual page address is translated by the pagination mechanism into physical page address. The page offset specifies a physical shift in the physical page, i.e. a shift from the address of the physical page.

The pagination of the memory allows the execution of the program with a virtual memory space larger than the existing physical memory space. Moreover, the pagination facilitates the program moving in different locations of physical memory during multiple or different executions of the program. The pagination also allows the simultaneous execution of multiple processes by the microprocessor, each process being able to access its own allocated physical memory pages without being collected from the hard disk for example and without needing to assign all the physical memory to only one process. Memory protection of other processes can also be facilitated on the basis of pagination.

The translation of the virtual page address into the physical page address is performed by sequentially reading a page table called page table walking operation or page table walk. The operating software of the microprocessor maintains and stores in the system memory, page tables containing information for translating a virtual page address into a physical page address. Therefore it is relatively onerous to carry out a page table walk when multiple memory accesses must be carried out for the translation. The page table walk is performed by the hardware, the software or a combination of both.

In order to improve the performances of the system by reducing the number of page table walks, many microprocessors benefit from a mechanism of storing page table information into a cache memory. This information comprises physical page addresses translated from virtual pages addresses recently used. This cache memory of page information is commonly known as a "page addresses translation buffer memory" or "Translation Lookaside Buffer or "TLB cache". The virtual page address is provided to the TLB cache that searches for this address. When this address is found, the TLB cache directly provides the address of the corresponding physical page without performing the page table walk for the translation. In this way, the system performances as well as the executing speed of the processes are enhanced thanks to this direct addresses converting.

When a partial or complete update of a stored piece of software must be performed in a discontinuous way in several memory types such as ROM (Read Only Memory), NVM (Non-Volatile Memory), RAM (Random Access Memory), etc., the memory management unit and the pagination mechanism largely facilitate the operations.

The update of a system can be carried out according to a first solution consisting of storing the new software in a free non-volatile physical memory and modifying the page table. Thus the processor will use the virtual addresses pointing towards the physical addresses of the memory where the new software is stored. When the update installation application has not to be updated itself, a fixed specific application performs the update of the related software according to a relatively simple mechanism. The system will work with the old software as far as the update is not finished and switches to the new software only when the latter is completely installed and checked by a control sequence such as a checksum or a hash.

When a single application also including the update installation application must be renewed in a system, the application passes through an unstable state during the modification process. The security of such application under modification depends on the reliability of the instructions or commands used for the update. This situation of vulnerability of the application cannot be acceptable in the field chip cards or security modules requiring a high security level. Moreover, if the update operation fails or is unexpectedly interrupted, a quite complex mechanism to restore the system towards the preceding state is required. This restoration further involves a passage of the system through an unstable state compromising the security.

The document US2006/129794A1 describes a method for updating a program in a flash memory without proceeding with the complete restart of the processor after update installation. A processor is associated with a memory management unit, a random access memory and a flash memory. The flash memory content is dynamically renewed by an update of a page table in which a pointer designates a new program stored in the flash memory. The obsolete program is either deleted, or maintained in the flash memory after the update of the page table.

SUMMARY OF THE INVENTION

The aim of the invention is to carry out a partial or complete update of piece of software in a system in a reliable way by preventing the unstable or incoherent transitory states generating security failures in the system. Another aim is to perform a secured update in an environment having a limited memory space as in the field of portable data carriers including embedded operating software.

This aim is reached by a method executed by an application for updating data stored in a plurality of physical memories connected to a memory management unit controlled by a microprocessor, said memory management unit performing an update transaction by translating virtual memory page addresses into physical memory pages addresses by reading a page table by following a plurality of address pointers forming a tree structure, the method is characterized in that it comprises steps of:

defining, by a first version attribute, pointers of a first sub-tree structure, said first sub-tree structure being used by the memory management unit for the current access of the application to the physical memory pages, defining, by a second version attribute, pointers to be used by the memory management unit, for the data update transaction in said physical memory pages, selecting, by the application, a set of free memory pages comprising pages having physical addresses designated by pointers defined by the first version attribute and pages having physical addresses designated by pointers defined by the second version attribute, said pointers forming a second sub-tree structure, updating data of the selected physical memory pages designated by the pointers of the second sub-tree structure, configuring, by the memory management unit, the page table in such a way that the application uses the pointers of the second sub-tree structure for the current access to the physical memory pages instead of the pointers of the first sub-tree structure used before the update.

The method of the invention consists of a background updating of data stored in physical memories without affecting the current operations performed by the microprocessor. Only when the update is entirely finished, the application switches from the old version to the new version of data. This switching occurs by a reconfiguration of the page table during which the first sub-tree structure of pointers accessing the old version of the memory data is replaced by the second sub-tree structure of pointers thus allowing accessing to the new version of data. This update method prevents the incoherent transitory states of the system as the latter works with the previous version of data until the installation of new version becomes usable. In case of interruption of the update process, the application will always be able to reinitialize because the old version of data can be reactivated by returning to the previous configuration of the page table.

Another advantage is that this method can be applied to limited memory capacity systems such as chip cards or security modules. In fact, the definition by a first version attribute of the pointers of the tree structure representing the memory addresses of the current version data and the definition by a second version attribute of the pointers representing data to be updated allows building two tree structures including common pointers. The presence of these common pointers allows preventing doubling the memory capacity necessary for storing two versions of data.

BRIEF DESCRIPTION OF THE FIGURES

The invention will be better understood by means of the following detailed description, which refers to the attached figures given as non-limitative examples.

DETAILED DESCRIPTION OF THE INVENTION

Figure 1:
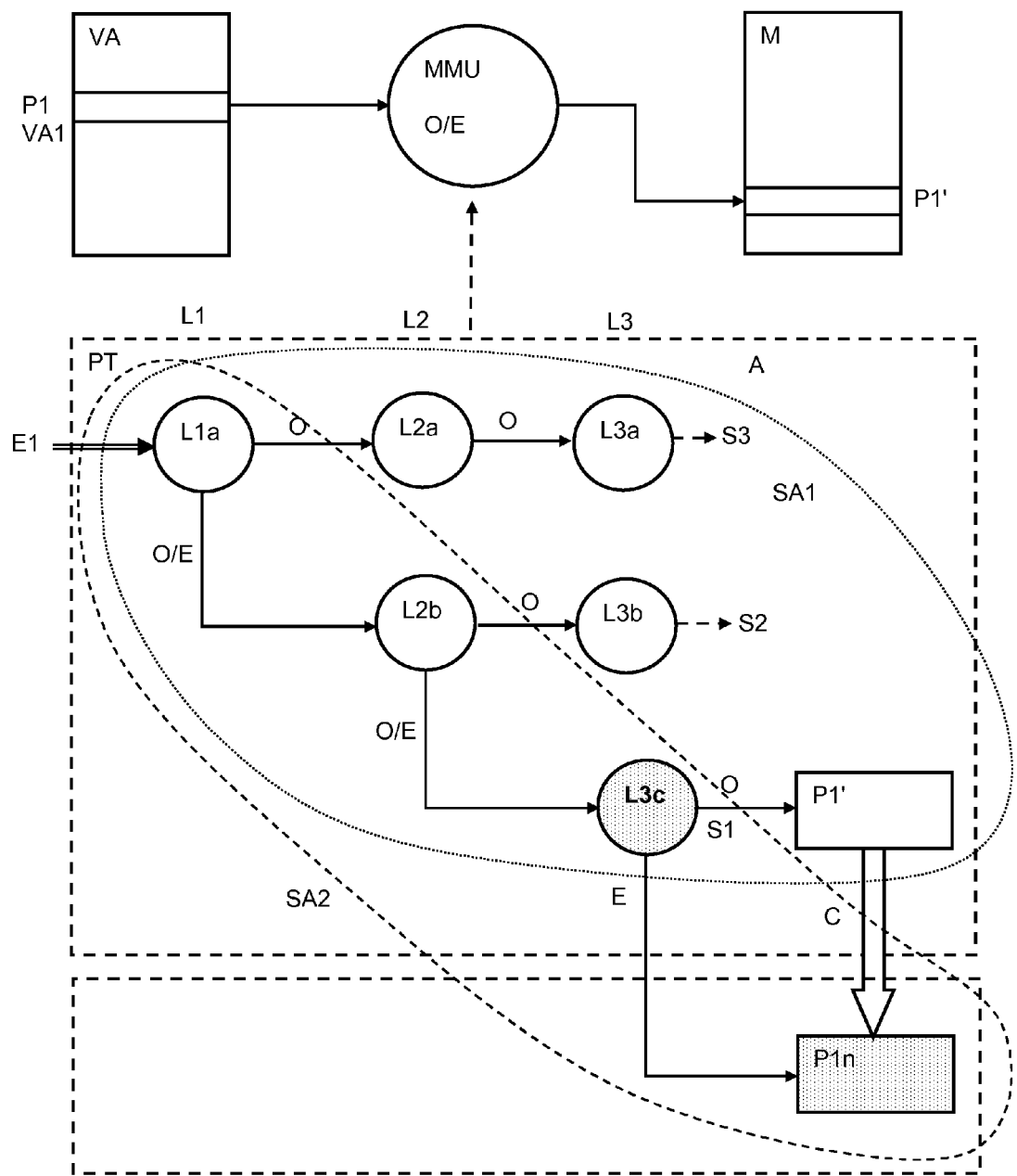
FIG. 1 shows a block diagram of an update of a memory page performed by modifying the version attribute of a pointer

FIG. 1 shows the mechanism for updating a memory page P1 having a virtual address (VA) by means of a memory management unit MMU translating the virtual page addresses into page addresses corresponding to physical memories M. This translation is performed by means of one or more page tables (PT) comprising a set of pointers through which the memory management unit looks in order to find out the physical address of the memory page designated by the address of the starting virtual page VA1. These pointers form nodes according to the terminology used in the field related to memories management units MMU.

According to the invention a node has an attribute O (Odd) or an attribute E (Even) corresponding respectively to an Odd pointer and to an Even pointer or moreover to an Odd or Even version of the node. The pointers indicate either another Odd or Even pointer of another node or the physical address of the memory page that can also contain a pointer towards data located at a predetermined address. In other words, a node gathers at least one pair of Odd and Even pointers and changes to an Odd or Even version depending on the used pointer version. According to an example of implementation, the Odd pointers indicate physical memory pages with an odd address while the Even pointers designate pages with an even address.

The nodes are distributed in the table according to different levels L1, L2, L3 and form a tree structure A with an input E1 resulting from the starting virtual page address VA1 and outputs (S1, S2, S3) leading to addresses of physical memory pages M. In most cases, these page addresses are distributed into various types of memories, namely ROM (Read Only Memory), NVM (Non-Volatile Memory), RAM (Random Access Memory), etc., and this in a discontinuous way, i.e. in a non consecutive way where the page N+1 does not necessarily follow the page N in the same type of memory.

In the example of FIG. 1, the memory management unit MMU is configured in order to use the version O (Odd) of the nodes before starting up the update. The virtual memory page P1 with the address VA1 corresponds to the page P1' of the physical memory M. The management unit MMU using the page table PT determines the address of the page P1' by walking through a sub-tree structure SA1 of the global tree structure A by using the pointers O (Odd) of the nodes L1a, L2b and L3c between the input E1 and the output S1 leading to the page P1'. The outputs S2 and S3 lead to other pages of the physical memory or to other nodes (not represented) of the sub-tree structure SA1 ending at physical page addresses.

During an update, the application selects a free page of physical memory by using the Even pointers (E) of the nodes. Thus in the example of FIG. 1, data is written in the new page P1n by using nodes L1a, L2b and L3c in their Even version (E) forming a sub-tree structure SA2 of the tree structure A leading to the memory page P1n.

Once the updating has been terminated the memory management unit modifies its configuration in order to use the node L3c in its Even version instead of Odd version for ending at the new page P1n. The version of the other nodes L1; L2a, L2b, L3a and L3b remains unchanged.

This operation following the data modification in a physical memory page is similar to a switching from a first sub-tree structure SA1 to a second sub-tree structure SA2 with respect to the page P1' that will be replaced by the page P1n. The other pages linked to the tree structure outputs S2 and S3 are not modified and are addressed by means of Odd versions of the corresponding nodes.

According to an embodiment, the page P1' pointed by the Odd version of the node L3c can be recycled by writing in it the content of page P1n designated by the Even pointer of the node L3c. In this way the node L3c can remain in its Odd version while designating the updated content of the page P1'.

In the terminology of the memory management units MMU, the operation for changing the version of a node for designating a new memory page is called "hardware commit". The operation of the above mentioned embodiment consisting of replacing the page content pointed by the node in Odd version with the page content pointed by the node in Even version is called "software commit".

Of course, an update may concern several pages of different memory types available to the system application. All these pages have a virtual address used by the microprocessor that will be converted into addresses of physical pages by means of the page table of the memory management unit MMU.

Figure 2:
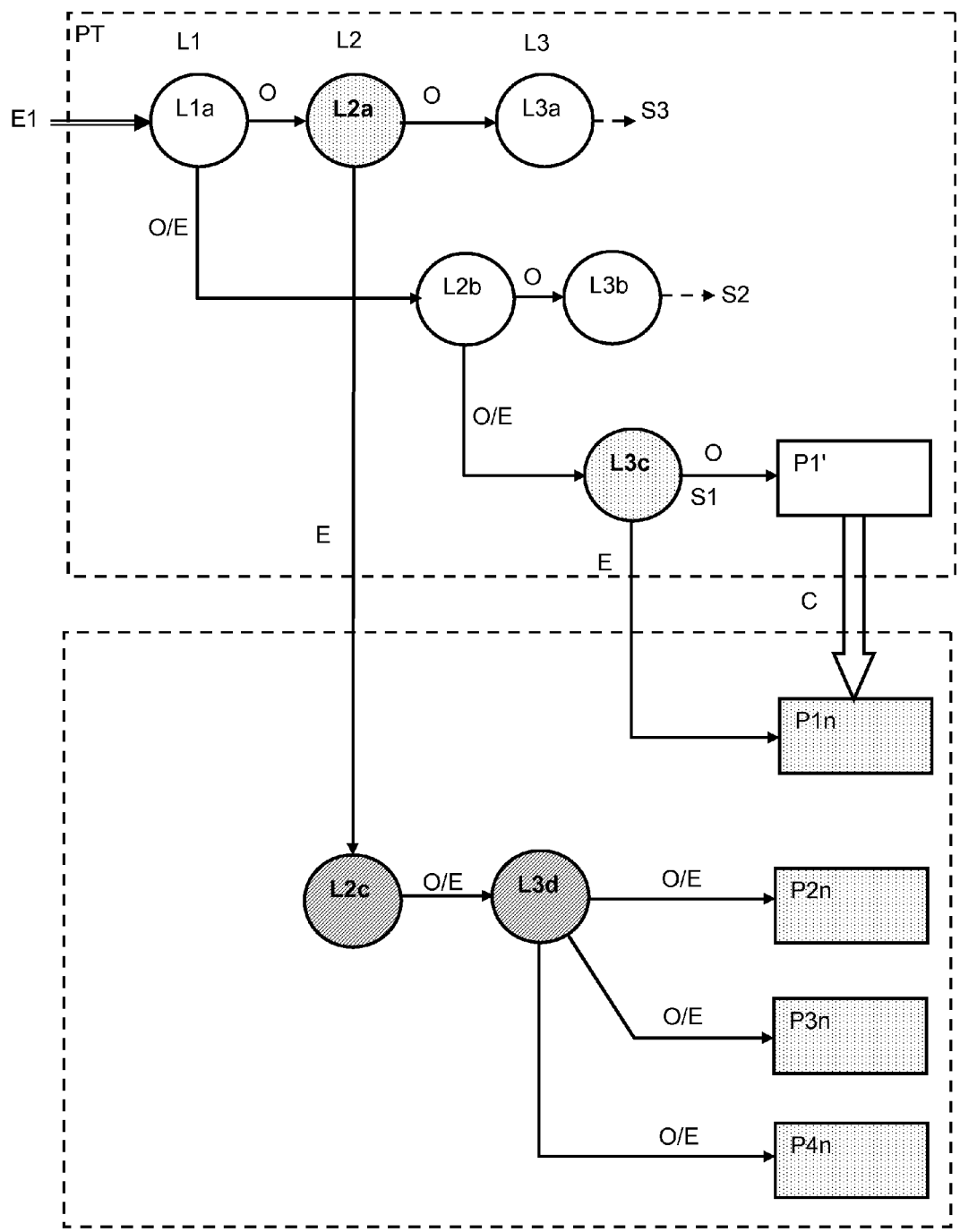
FIG. 2 shows an extension of the block diagram of FIG. 1 in which the update causes the creation of three new memory pages and two new pointers.

FIG. 2 shows an example wherein three additional pages are updated with regard to the example of FIG. 1. As in the previous example, the memory management unit MMU is configured in order to use the O version (Odd) of the nodes before the update.

During a step for preparing the update, the application explores the available memory in order to determine on the one hand which pages must be modified and on the other hand the number of new pages to be allocated according to the size of the update and the one of the memory.

In a first step, the application stores data from the updating in an existing page P1n by using the Even pointer of the node L3c as before. Moreover, the application allocates pages P2n, P3n and P4n to store the new update data, which needs the creation of two new nodes L2c and L3d at the second and third level (L2, L3) of the tree structure. These new nodes L2c and L3d will be designated by the Even pointer of the node L2a located at the second level L2. The page table thus becomes larger proportionally to the increase in the number of memory pages used by the update. The number of nodes containing Odd and Even pointers increases in the same way in order to provide the next updates by using the one or the other of the versions of the nodes for pointing to the appropriate pages.

In a second step, when the updating data is stored in the appropriate physical memory pages, they are verified before their implementation by means of the modified pages table. This verification consists of controlling the integrity of the stored data in order to detect any possible modification or manipulation that may have been carried out during the update process.

The verification is preferably carried out with control data forming a control sequence (checksum) or a signature resulting from a digest calculated with a unidirectional mathematical function (Hash) and encrypted with a key known by the system. This control data calculated on all or part of the updating data is provided with the latter and stored in one or more predetermined memory pages. The update installation application then recalculates this control data with a corresponding program or algorithm by using the update data effectively stored in the memories.

A successful comparison of the stored control data with the calculated data allows the memory management unit MMU to validate the update installation and the version modification of the nodes related to said update in the page table.

If the comparison fails, the memory management unit MMU blocks the switching from the old to the new version. Accordingly, the application will work in the conditions preceding the update, i.e. with a version of the nodes of the page table remaining unchanged.

In the example of FIG. 2, when the update is installed and validated, the starting-up operation of the new version or "commit" performed by the memory management unit MMU consists of modifying the version of nodes L2a and L3c of the Odd version into Even version. The pointer of Even version of the second level node L2a will thus designate the new second level node L2c whose Odd or Even pointer designates the new third level node L3d. The latter is an example of node containing three pairs of Odd and Even pointers intended to address the three new pages (P2n, P3n, P4n) of physical memory. These pages are respectively designated by one of the Odd or Even pointers of the node L3d. The other pointer of each pair can be reserved for a further update of one of these three memory pages (P2n, P3n, P4n).

The Even version pointer of the node L3c of the third level designates the new first page P1n that replaces the page P1' that was designated by the Odd version of the node L3c in the old version of the table.

Besides the addition of three new memory pages, the update has thus modified the tree structure of the page table through the creation of two new nodes and the change of version of two other nodes.

It should be noted that the nodes of a tree structure in a memory page table are not all modifiable by the memory management unit, i.e. able to change from an Odd version to an Even version and inversely. Some nodes thus correspond to a single pointer that remains invariable during the updates.

Since each node has a space in the system memory proportional to the number of pointers associated with the node and in order to minimize the memory space occupied by the tree structures, the nodes can be defined by a configuration parameter. The latter informs the memory management unit MMU about the number of pointers associated with said node defining a variable or invariable characteristic of the node. During an update, a variable node corresponds to one or more Odd/Even pairs of pointers being able to change the version while an invariable node generally corresponds to a single pointer remaining constant with an Odd or Even attribute or without attribute. When the memory management unit MMU builds a tree structure for a new update, said unit considers the configuration parameter of the nodes in order to rationalize the use of the variable nodes and of the invariable nodes to save the memory space used by the tree structure.

The example of FIG. 2 is not exhaustive with regard to the configuration of the page table used for this update. In fact, a modification and the creation of other nodes at different levels can lead to a similar result. In other words, various tree structures are possible in a page table for translating a given set of virtual memory page addresses in a set of corresponding physical memory pages addresses.

In order to accelerate the walk of the page table during updates, some of the physical page addresses obtained from the corresponding virtual addresses during the previous walks of the page table can be memorized in a cache memory associated to the memory management unit MMU. This cache memory called "page addresses translation buffer memory" or "Translation Lookaside Buffer or "TLB cache" allows achieving an immediate conversion of addresses without walking through the page table. The limited size of this cache memory does not allow memorizing all the walks of the page table, but only the most recent.

For example, the cache memory may contain a pointer directed towards a physical memory page containing control data that the memory management unit MMU uses to verify integrity of the update before its validation.

The invention claimed is:

1. A method executed under control of an application for updating data stored in a plurality of physical memories connected to a memory management unit controlled by a microprocessor, said memory management unit performing an update transaction by translating virtual memory page addresses into physical memory pages addresses by reading a page table by following a plurality of address pointers forming a tree structure, the method comprising steps of:
    defining, by a first version attribute, pointers of a first sub-tree structure, said first sub-tree structure being used by the memory management unit for the current access of the application to the physical memory pages;
    defining, by a second version attribute, pointers to be used by the memory management unit, for the data update transaction in said physical memory pages;
    selecting, by the application, a set of free memory pages comprising pages having physical addresses designated by pointers defined by a first version attribute and pages having physical addresses designated by pointers defined by a second version attribute, said pointers defined by the second version attribute forming a second sub-tree structure;
    updating data of the selected physical memory pages designated by the pointers of the second sub-tree structure;
    configuring, by the memory management unit, the page table in such a way that the application uses the pointers of the second sub-tree structure for the current access to the physical memory pages instead of the pointers of the first sub-tree structure used before the update.

2. The method according to claim 1 wherein the page table includes nodes gathering at least one pair of pointers defined by the first version attribute and by the second version attribute respectively, said nodes forming a tree structure read by the memory management unit.

3. The method according to claim 2 comprising, during updating data of the physical memory pages, additional steps of:
    exploring the available physical memory and allocation of additional memory pages intended to store update data;
    creating additional nodes designating the additional pages previously allocated;
    modifying the version attribute of at least one node of the tree structure during the configuration of the page table by the memory management unit in such a way that the application accesses the additional nodes designating the additional pages previously allocated.

4. The method according to claim 2 wherein, during the modification of the version attribute of a node of the page table by the memory management unit, the content of a memory page designated by a pointer of said node defined by the attribute of the version preceding the update is replaced by the content of the memory page designated by the pointer defined by the attribute of a new version.

5. The method according to claim 2 wherein, the nodes are defined by a configuration parameter informing the memory management unit on the number of pointers associated to said node defining a variable or invariable characteristic of the node during an update.

6. The method according to claim 1 wherein the first sub-tree structure comprises nodes defined by the first version attribute, said nodes containing pointers defined by the first version attribute used by the application to access the physical memory pages.

7. The method according to claim 1 wherein the second sub-tree structure includes at least one node defined by the second version attribute, said node containing a pointer defined by the second version attribute used by the application to designate a new memory page intended to store update data.

8. The method according to claim 1 wherein the page table is configured by the memory management unit in such a way that the application accesses the updated memory pages by using the pointers of the second sub-tree structure comprising nodes defined by the first version attribute and at least one node defined by the second version attribute.

9. The method according claim 1 comprising a further step of verifying, when update data is stored in the appropriate physical memory pages, by comparing control data previously stored in one or more predetermined memory pages with control data calculated from the update data stored in the physical memories.

10. The method according to claim 9 wherein the verification is carried out with control data forming a signature resulting from a digest calculated with an unidirectional mathematical function of the Hash type and encrypted with a key known by the system, said control data calculated on all or part of the update data are provided with the update and stored in one or more predetermined memory pages, the application recalculates the control data by using the update data effectively stored and compares them with the control data previously stored.

11. The method according to claim 9 wherein, the memory management unit validates the installation of the update and the modification of the version attributes of the nodes concerned by said update in the page table if the comparison is successful.

12. The method according to claim 9 wherein, the memory management unit blocks the switching from a previous to a new version of the application if the comparison fails, said application working in the conditions preceding the update with unchanged version attributes of the nodes of the page table.

13. The method according to claim 1 wherein, physical memory page addresses are read from a cache memory associated with the memory management unit, said physical memory page addresses stored in said cache memory being obtained from the corresponding virtual addresses during previous reading of the page table.

* * * * *